United States Patent Office 3,480,631
Patented Nov. 25, 1969

3,480,631
CHLORINATION OF 3,6-DISUBSTITUTED URACILS
Earl W. Cummins, Wilmington, Del., assignor to E. I. du Pont de Nemours and Company, Wilmington, Del., a corporation of Delaware
No Drawing. Filed Mar. 24, 1967, Ser. No. 625,631
Int. Cl. C07d 51/30
U.S. Cl. 260—260                              11 Claims

ABSTRACT OF THE DISCLOSURE

A process for making 5-chloro-3,6-disubstituted uracils by reacting a mixture of a 3,6-disubstituted uracil in an aprotic solvent with sulfuryl chloride at a temperature between 40 and 100° C., adding water to the reaction mixture, adding caustic to adjust the pH between 5.5 and 8, and subsequently distilling away the solvent. The desired 5-chloro-3,6-disubstituted uracil is then recovered from the distillation residue.

BACKGROUND OF THE INVENTION

This invention relates to novel processes for the preparation of 5-chloro-3,6-disubstituted uracils. More particularly, this invention relates to processes for the manufacture of such uracils by the chlorination of 3,6-disubstituted uracils with sulfuryl chloride under certain conditions, according to the following equation:

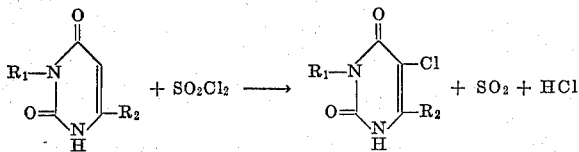

where $R_1$ is alkyl of 2 through 8 carbon atoms, cycloalkyl of 5 through 8 carbon atoms, cyloalkylalkyl of 6 to 8 carbon atoms, aryl of 6 to 8 carbon atoms, or aralkyl of 7 to 8 carbon atoms, provided that these groups can be substituted with up to two methyl, methoxy or chlorine groups; and $R_2$ is methyl, ethyl, n-propyl or iso-propyl.

The uracils produced according to the process of this invention are useful as herbicides. Details regarding this activity will be found in U.S. Patent 3,235,357.

U.S. Patent 3,274,196 describes a process for making 5-chloro-3,6-disubstituted uracils by adding to an aqueous slurry of the appropriate 3,6-disubstituted uracil after it has been heated to a temperature between 60 and 110° C., liquid or gaseous chlorine. The resulting reaction mass is then cooled and the 5-chloro-3,6-disubstituted uracil is recovered according to conventional methods.

The process of the subject invention has advantages over the process of the patent in that increased yields and purity are obtained with use of inexpensive solvents. Further, the product is easier to recover.

BRIEF SUMMARY OF THE INVENTION

In the process of the invention, a mixture is prepared of a 3,6-disubstituted uracil and an aprotic solvent, the concentration of the mixture being between 5 and 50% by weight uracil. Sulfuryl chloride is then added to the mixture, sufficient sullfuryl chloride is added to produce a 0 to 20% stoichiometric excess. The reaction is generally run at a temperature between 40° C. and 100° C.; however, the reaction may be started as low as 25° C., using the heat evolved during the addition of up to one-third of the sulfuryl chloride to raise the temperature into the desired range. Thereafter, the rate of addition of sulfuryl chloride is balanced with cooling and heating of the reactor to maintain the temperature of the reaction mass between 40 and 100° C. Generally, the total addition time is about 30 to 90 minutes. After the addition, the reaction mass is held at a temperature between 40 and 100° C. for a period of time between 0 to 60 minutes. The process is operated under atmospheric conditions.

After the holding period, an amount of water is added to the reaction mass which is equal to 0.5 to 20 times by weight the amount of uracil in the original mixture. The hydrogen chloride by-product formed is neutralized at this time with aqueous alkali, such as sodium hydroxide.

The reaction mass is then distilled until the solvent has been completely removed. Water can also optionally be added during the distillation cycle, as well as prior to distillation or in connection wtih the neutralization. The total amount of water added is sufficient to compensate for the amount removed during the distillation plus an additional amount of sufficient to give a 5 to 50% slurry of the reaction product in water after the distillation has been completed.

The desired 5-chloro-3,6-disubstituted uracil is then isolated from the aqueous slurry by conventional methods. Thus the solids can be separated by filtration, washed with water to remove by-product salts and then dried.

DETAILED DESCRIPTION OF THE INVENTION

The 3,6-disubstituted uracil starting materials for the process of the invention can be prepared by the reaction of a properly substituted urea with a beta-keto ester to give a ureido intermediate; the ring is then closed under alkaline conditions to give the corresponding 3,6-disubstituted uracil product. The 3-substituted-6-methyluracil starting materials can also be prepared by reacting a properly substiuted acetoacetamide with an an alkyl carbamate to give an intermediate crotonamide, which is then ring closed to give the corresponding uracil. These processes are set forth in greater detail in U.S. Patent 3,235,-362 and Canadian Patent 727,624.

It is not necessary for the processes of the invention that the starting uracil be in the pure isolated form. It can be in the form of an anhydrous salt, for example, the sodium salt. Further, the uracil can be in the form of a reaction product, i.e., a solution of the uracil in an aprotic solvent such as xylene, which is obtained from the acidification of the reaction mixture from the ring closure step of the beta-keto ester process of U.S. Patents 3,235,362 or 3,254,082.

The acidification can be brought about by adding sufficient mineral acid, e.g., sulfuric, to lower the pH to 5.5–8. However, if the starting uracil is prepared using an alkyl urea, to obtain the best results in the process of this invention, it is desirable to reduce substantially the amount of unreacted substituted urea which is present in the organic solution. (Although the term "unreacted urea" is used to designate free urea starting material in the system, it is believed that a substantial portion of this urea did react in the condensation step to form an unidentified by-product which by-product then decomposed in subsequent steps.) This is easily accomplished, for example, by subjecting the organic solution to counter current extraction with water. The extracted organic layer is then dried by distillation and is suitable to produce a high yield of high purity product. The uracil that is extracted into the aqueous phase can be recovered by counter current extraction with the solvent used in the beta-keto ester reaction; this organic extract can then be added back to the acidification step so that essentially no loss of uracil results from the purification process.

In carrying out the process of this invention, a mixture of an appropriate uracil starting material is prepared in an aprotic solvent to form a 5 to 50% by weight concentration of the uracil. A concentration of 25 to 35% is preferred because higher concentrations make the slurry difficult to stir or mix and lower concentrations require larger equipment without any improvement in yield or purity. If an unisolated form of the uracil is used, the desired concentration, if necessary, can be produced either by adding solvent or by removing it by distillation.

Suitable aprotic solvents for use as the chlorination medium of the process include: benzene, toluene, xylene, chloroform and carbon tetrachloride. The preferred solvents are benzene, toluene or xylene, particularly since these solvents are normally used in the production of the starting 3,6-disubstituted uracils, thus these uracils need not be isolated from the solvent prior to being used in the process of the invention.

To the mixture is then added sulfuryl chloride. A 0 to 20% stoichiometric excess of sulfuryl chloride is added to the mixture, preferably a 0 to 15% excess. The preferred excess will vary with the temperature; at the higher temperatures a smaller excess can be used. It has been found that a high yield of a product of high purity is obtained with a slight stoichiometric excess. Larger stoichiometric excesses, although operative, are uneconomical.

The sulfuryl chloride is added to the mixture over a period of time such that the temperature of the reaction is maintained at 40° to 100° C., preferably at 55° to 75° C. and most preferably at 65° C. Generally, the time of addition will be about 30 to 90 minutes. The shorter time is preferred since the yield decreases with longer reaction times. However, the time is dependent upon the rate of heat transfer at the desired temperature and the ability to handle the off gas.

The nature of the reaction changes at about the midpoint. The first half of the reaction is quite exothermic while the second half is slightly endothermic. There is no gas evolved during the first half of the reaction while about one half of the theoretical sulfur dioxide and hydrogen chloride are evolved during the second half of the reaction.

After the addition is complete, the reaction mass is maintained at the same temperature, i.e., between 40 and 100° C., and preferably between 55 and 75° C., for a period of time from 0 to 60 minutes, preferably 10 to 30 minutes.

After this holding period, water is added to the reaction mass such that the amount added is equal to 0.5 to 20 times the weight of the 3,6-disubstituted uracil in the original mixture, preferably 0.5 to 4 times the weight. The amount of water added in this and subsequent steps is such as to provide a 5 to 50% slurry of the reaction product in the water once the aprotic solvent has been removed from the reaction mixture.

Also, after the addition of water the hydrogen chloride and sulfur dioxide by-products formed are neutralized by adjusting the pH in the aqueous phase to between pH 5.5 and 8 by the addition of sodium hydroxide or other suitable base.

The solvent is then removed from the reaction mixture by distillation, e.g., steam distillation. During the distillation, if necessary, water is added to obtain a 5 to 50% slurry of the reaction product in water after the solvent has been removed. The slurry concentration may further be adjusted by adding water after distillation is complete.

Optionally, seed crystals of the desired reaction product can also be added during distillation. Generally, the amount of seed crystals added is small, and in any event, the amount added is not critical. The use of seed crystals aids in the build up of large particles. A final product of large particle size is easier to handle.

In addition to removing the aprotic solvent, the azeotropic distillation also serves to convert the by-products of the reaction to water soluble materials which are easily removed from the product during the isolation procedure to insure that this conversion is essentially complete, especially if a low boiling solvent such as benzene or carbon tetrachloride is used, the aqueous slurry may be held for about 10 minutes at the boiling point of water.

An alternative to distillation for purifying the product and at the same time ending up with an aqueous slurry is to continue the addition of sodium hydroxide during the above pH adjustment step until all the product has been converted into its sodium salt, which is water soluble. Next the aqueous layer is separated from the aprotic solvent and then acidified with mineral acid. However, this procedure is less convenient than steam distillation and adds the expense of using more base and acid.

After the solvent has been removed, the solid reaction product is recovered. This can be accomplished by any suitable means, such as filtration or centrifugation. The solid product thus separated is either then washed with water or repulped in water and again separated. The water used for washing or repulping should preferably be at 30–80° C. The resulting residue is then dried by conventional means to give the substituted 5-chlorouracil as an almost pure, crystalline material.

In the process of this invention the yield and quality of the final product are tied together—process conditions which give higher yields also tend to give a purer product. Under the preferred conditions, i.e., reaction conducted at 65° C. with 0 to 5% excess sulfuryl chloride, a yield of 93 to 95% is obtained of highly-pure product.

This invention will be more easily practiced and more easily understood by referring to the following illustrative examples; all parts are by weight unless otherwise designated.

EXAMPLE 1

A slurry of 175 parts tert.-butylurea, 168.5 parts of methyl acetoacetate, 304 parts xylene and 1 part of concentrated sulfuric acid are reacted as described in U.S. Patent 3,254,082 to give a reaction mass containing 249 parts of methyl 3-(3-tert.-butylureido) crotonate. A solution of 93 parts of sodium methylate in 340 parts of methanol is added to the above reaction mass; 366 parts of solvent is then removed by distillation and 535 parts of water is added to the residue; this procedure is also described in U.S. Patent 3,254,082.

Four hundred parts of xylene recycle from a previous batch (see below), is added to the resulting two-phase system and the pH of the aqueous phase is adjusted to 7 by the addition of concentrated sulfuric acid with good agitation while the temperature is maintained at about 50° C. with external cooling as necessary. The layers are allowed to separate and the lower aqueous phase is drawn off and discarded.

The upper organic phase is then subjected to counter current extraction with two parts of water per part of organic phase at 60° C.

The resulting organic extract is distilled under vacuum until 720 parts of residue are obtained. This distillation removes the small amounts of water and methanol present in the organic layer.

The resulting aqueous extract is then subjected to counter current extraction with xylene to recover most of the uracil dissolved in the water. The xylene extract is then recycled to the next batch. The aqueous layer is discarded.

The residue from the above distillation is cooled to 65° C. and 157 parts of sulfuryl chloride is added with good agitation over a period of ½ hour while the temperature is maintained at 65° C. by external cooling and heating as required. The resulting reaction mass is then held at 65° C. for an additional 10 minutes. Next 754 parts of water are added and the pH of the resulting two-phase system is adjusted to 6.5 with 50% aqueous sodium hydroxide.

The xylene is then removed by azeotropic distillation at atmospheric pressure. Water containing a small amount (0.1 part) of seed crystals of 3-tert.-butyl-5-chloro-6-methyluracil is added throughout the distillation. Water added is equal in volume to the lower layer of the distillate.

The resulting slurry is cooled to 40° C. and filtered. The residue is then repuled in 830 parts of water, filtered and dried to give 227 parts (72% of theoretical based on methyl acetoacetate) of 3-tert.-butyl-5-chloro-6-methyluracil having a purity greater than 98% by infrared analyses.

EXAMPLE 2

22.7 parts of sulfuryl chloride is added to a well-stirred slurry of 30 parts of 3-tert.-butyl-6-methyluracil in 75 parts of xylene during ½ hour while the temperature is maintained at 65° C. The amount of sulfuryl chloride added is equivalent to a 2.5% stoichiometric excess. After an additional period of 10 minutes at 65° C., 110 parts of water is added and the pH of the aqueous layer is adjusted to 6.5 with 50% aqueous sodium hydroxide. The xylene is then removed by azeotropic distillation. Water containing a small amount (0.01 part) of seed crystals of 3-tert.-butyl-5-chloro-6-methyluracil is added throughout the distillation. The amount of water added is equal in volume to that in the lower layer of the distillate. The final aqueous slurry is held for 10 minutes at the boiling point of water.

The resulting slurry is cooled to 40° C. and filtered; the residue is repulped in 116 parts of hot water, filtered and dried to give 33.5 parts (94.0% of theory) of essentially pure 3-tert.-butyl-5-chloro-6-methyluracil.

The above procedure can be followed and similar results are obtained when 180 parts of xylene are used rather than 75 parts.

When 45 parts of xylene are used instead of 75, there is a minor reduction in yield.

The same procedure as detailed above is followed except that the uracil starting material is varied as set forth in the table below:

TABLE I

| Uracil Starting Material | Parts Used | Yield of 5-chloro-analog (percent of theory) |
| --- | --- | --- |
| 3-sec.-butyl-6-methyluracil | 30.0 | 96 |
| 3-isopropyl-6-methyluracil | 27.4 | 95 |
| 3-cyclohexyl-6-methyluracil | 34.3 | 97 |
| 3-n-pentyl-6-methyluracil | 32.3 | 94 |
| 3-cyclohexyl-6-isopropyluracil | 38.9 | 92 |

The following 5-chloro-3,6-disubstituted uracils can be prepared from the corresponding unhalogenated uracils by chlorinating with sulfuryl chloride, using essentially the method of the above example:

3-n-butyl-5-chloro-6-methyluracil
5-chloro-3-phenyl-6-methyluracil
5-chloro-3-(1-ethylpropyl)-6-methyluracil
5-chloro-3-(beta-phenethyl)-6-methyluracil
5-chloro-3-cyclohexylmethyl-6-methyluracil
5-chloro-3-(2,4-dimethylcyclohexyl)-6-methyluracil
5-chloro-3-(4-methoxycyclohexyl)-6-methyluracil
5-chloro-3-(2-chlorocyclohexyl)-6-methyluracil
5-chloro-6-ethyl-3-n-pentyl uracil
5-chloro-3-cyclooctyl-6-methyluracil
5-chloro-3-ethyl-6-methyluracil
5-chloro-3-(n-octyl)-6-methyluracil
3-sec.-butyl-5-chloro-6-isopropyluracil

EXAMPLE 3

Twenty-three and three-tenths parts of sulfuryl chloride is added to a well-agitated slurry of 30.0 parts of 3-tert.-butyl-6-methyluracil in 75 parts of xylene during ½ hour. The temperature increases spontaneously from 30° C. to 65° C. during the first one-third of the sulfuryl chloride addition and is maintained there by cooling and heating as necessary. The amount of sulfuryl chloride added is equivalent to a 5% stoichiometric excess. After an additional 5 minutes at 65° C., 15 parts of water is added and the pH of the aqueous layer is adjusted to 6.0 with 50% aqueous sodium hydroxide while the temperature is maintained at 50 to 55° C. by external cooling. The xylene is then removed by azeotropic distillation and water containing a small amount (0.05 part) of seed crystals is added throughout the distillation to maintain a constant liquid volume in the still. After the vapor temperature is greater than 99° C., the distillation is continued for ten minutes and then is terminated.

The resulting slurry is cooled to 60° C. and filtered; the residue is repulped in 116 parts of water, filtered and dried to give 33.5 parts (95% of theory) of essentially pure 3-tert.-butyl-5-chloro-6-methyluracil.

EXAMPLE 4

The reaction of Example 2 is performed to produce 3-tert.-butyl-5-chloro-6-methyluracil wherein the reaction temperature, amount of sulfuryl chloride, the time for addition of the sulfuryl chloride are varied to indicate the effect of these variables on the yield. The results are tabulated in the following table:

TABLE II

| Reaction Temperature, ° C.: | Stoichiometric Excess of Sulfuryl Chloride | Addition time of Sulfuryl Chloride (minutes) | Yield (Percent of Theoretical) |
| --- | --- | --- | --- |
| 5 | 0 | 30 | 70 |
| 30 | 5 | 30 | 77 |
| 40 | 15 | 30 | 87 |
| 40 | 25 | 30 | 80 |
| 50 | 5 | 30 | 90 |
| 50 | 15 | 30 | 86 |
| 55 | 2.5 | 30 | 94 |
| 65 | 0 | 30 | 93 |
| 65 | 5 | 30 | 94 |
| 65 | 5 | 180 | 89 |
| 65 | 15 | 30 | 88 |
| 80 | 5 | 30 | 94 |
| 80 | 5 | 180 | 84 |
| 100 | 5 | 30 | 90 |

Similar results are obtained when the solvent used is benzene, toluene or carbon tetrachloride.

I claim:

1. In a process for preparing 5-chloro-3,6-disubstituted uracils by chlorination of the corresponding unhalogenated uracils with sulfuryl chloride, the improvement of conducting the chlorination at a temperature between 40° and 100° C. using an aprotic solvent as a chlorination medium.

2. A process for the preparation of 5-chloro-3,6-disubstituted uracils, said process comprising the steps of:
   (a) preparing a mixture comprising from 5 to 50% by weight of a 3,6-disubstituted uracil in an aprotic solvent,
   (b) adding to said mixture a 0 to 20% stoichiometric excess of sulfuryl chloride, the addition being made while maintaining the temperature of the reaction mass at 40° to 100° C.,
   (c) holding the reaction mass at a temperature of 40° to 100° C. for a period of 0 to 60 minutes,
   (d) adding an amount of water to the reaction mass equal to 0.5 to 20 times by weight the amount of 3,6-disubstituted uracil in the original mixture,
   (e) adjusting the pH of the reaction mass to between pH 5.5 and pH 8,
   (f) distilling away said solvent while, as necessary, adding water so that a 5 to 50% aqueous slurry of the 5-chloro-3,6-disubstituted uracil is obtained,
   (g) recovering the 5-chloro-3,6-disubstituted uracil from the resulting aqueous slurry.

3. The process of claim 2 wherein during the distillation step the aqueous slurry is maintained for about 10 minutes at about 100° C.

4. The process of claim 2 wherein the mixture is the organic phase obtained after the acidification of the reaction mass resulting from the addition of water to the ring closure step of a substituted urea and beta-keto ester reaction.

5. The process of claim 4 wherein unreacted substituted urea in the mixture is removed by counter-current extraction with water.

6. A process for the preparation of 5-chloro-3,6-disubstitutde unracils, said process comprising the steps of:
(a) preparing a mixture comprising from 25 to 35% by weight of a 3,6-disubstituted unracil in a solvent selected from the group consisting of benzene, toluene, xylene, chloroform or carbon tetrachloride,
(b) adding to said mixture a 0 to 5% stoichiometric excess of sulfuryl chloride, the addition being made while maintaining the temperature of the reaction mass at 55 to 75° C.,
(c) holding the reaction mass at a temperature between 55 and 75° C. for a period of 10 to 30 minutes,
(d) adding an amount of water to the reaction mass equal to 0.5 to 4 times by weight the amount of 3,6-disubstituted unracil in the orginal mixture,
(e) adjusting the pH of the reaction mass to between pH 5.5 and pH 8,
(f) distilling away said solvent while, as necessary, adding water so that a 5 to 50% aqueous slurry of the 5-chloro-3,6-disubstituted unracil is obtained,
(g) recovering the 5-chloro-3,6-disubstituted unracil from the resulting aqueous slurry.

7. The process of claim 6 wherein the mixture is the organic phase obtained after the acidification of the reaction mass resulting from the addition of water to the ring closure step of a substituted urea and beta-keto ester reaction.

8. The process of claim 7 wherein unreacted substituted urea in the mixture is removed by counter-current extraction with water.

9. The process of claim 6 wherein during the distillation step seed crystals of the desired 5-chloro-3,6-disubstituted unracil are added to the reaction mass.

10. A process for the preparation of 5-chloro-3-tert.-butyl-6-methyluracil, said process comprising the steps of:
(a) preparing a mixture comprising from 25 to 35% by weight of 3-tert.-butyl-6-methyluracil in xylene,
(b) adding to said mixture a 0 to 5% stoichiometric excess of sulfuryl chloride, the addition being made while maintaining the temperature of the reaction mass at 55 to 75° C.,
(c) holding the reaction mass at a temperature between 55 and 75° C. for a period of 0 to 10 minutes,
(d) adding an amount of water to the reaction mass equal to 0.5 to 4 times by weight the amount of 3-tert.-butyl-6-methyluracil in the original mixture,
(e) adjusting the pH of the reaction mass to between pH 5.5 and 8,
(f) distilling away said xylene while, as necessary, adding water so that a 5 to 50% aqueous slurry of 3-tert.-butyl-6-methyluracil is obtained.
(g) recovering the 5-chloro-3-tert.-butyl-6-methyluracil from the resulting aqueous slurry.

11. The process of claim 10 wherein the mixture is the organic phase obtained after the acidification of the aqueous reaction mass resulting from the addition of water to the ring closure step following condensation of methyl acetoacetate with tert.-butyl urea, the unreacted tert.-butyl urea being removed by counter-current extraction with water.

References Cited
UNITED STATES PATENTS 3,235,357   2/1966   Loux _____ 260—260

ALEX MAZEL, Primary Examiner

ANNE MARIE TIGHE, Assistant Examiner